US012697005B2

(12) United States Patent

Heselwood et al.

(10) Patent No.: US 12,697,005 B2

(45) Date of Patent: Aug. 4, 2026

(54) VACUUM CLEANING DEVICE

(71) Applicant: Black & Decker, Inc., New Britain, CT (US)

(72) Inventors: Gerard Malcolm Heselwood, County Durham (GB); Ross A. Billings, Reisterstown, MD (US)

(73) Assignee: BLACK & DECKER INC., New Britain, CT (US)

( * ) Notice: Subject to any disclaimer, the term of this patent is extended or adjusted under 35 U.S.C. 154(b) by 698 days.

(21) Appl. No.: 17/979,355

(22) Filed: Nov. 2, 2022

(65) Prior Publication Data

US 2024/0138638 A1     May 2, 2024

(51) Int. Cl.
| | |
|---|---|
| *A47L 9/14* | (2006.01) |
| *A47L 5/24* | (2006.01) |
| *A47L 9/12* | (2006.01) |
| *A47L 9/22* | (2006.01) |
| *B01D 46/00* | (2022.01) |

(Continued)

(52) U.S. Cl.
CPC ................. *A47L 9/149* (2013.01); *A47L 5/24* (2013.01); *A47L 9/12* (2013.01); *A47L 9/1409* (2013.01); *A47L 9/22* (2013.01); *B01D 46/0043* (2013.01); *B01D 46/0087* (2013.01); *B01D 46/521* (2013.01); *B01D 46/62* (2022.01); *B01D 2267/40* (2013.01); *B01D 2273/30* (2013.01); *B01D 2279/55* (2013.01)

(58) Field of Classification Search
CPC ..... A47L 5/24; A47L 9/12; A47L 9/20; A47L 9/22; A47L 9/106; A47L 9/149; A47L 9/1409; B01D 46/0043; B01D 46/0087; B01D 46/62; B01D 46/521; B01D 2267/40; B01D 2273/30; B01D 2279/55

See application file for complete search history.

(56) References Cited

U.S. PATENT DOCUMENTS

| | | | |
|---|---|---|---|
| 8,661,608 B2 | 3/2014 | Knopow et al. | |
| 8,661,609 B2 | 3/2014 | Knopow et al. | |
| 10,244,910 B2 | 4/2019 | Conrad | |

(Continued)

FOREIGN PATENT DOCUMENTS

| | | | | |
|---|---|---|---|---|
| CN | 113892849 A | 1/2022 | | |
| DE | 102016100820 B4 * | 7/2007 | ............... | A47L 5/24 |

(Continued)

OTHER PUBLICATIONS

Extended European Search Report, dated Mar. 25, 2024, in related EP application No. 23207272.8-1016.

*Primary Examiner* — Brian D Keller
*Assistant Examiner* — Keegan T Martin
(74) *Attorney, Agent, or Firm* — Mannava & Kang, P.C.

(57) ABSTRACT

A vacuum cleaning device comprises a housing having a dirty air inlet and a clean air outlet. An airflow path extends between the dirty air inlet and the clean air outlet. A dust container is mounted to the housing wherein the airflow path goes through the dust container. A motor fan assembly is mounted in the housing and is configured to create an air flow along the airflow path in a blow mode and a suction mode. A controller is configured to control the motor fan assembly in the blow mode and the suction mode. The controller is configured to control the motor fan assembly to pulse the motor fan assembly at first fan speed when in the blow mode.

12 Claims, 8 Drawing Sheets

(51) Int. Cl.
    *B01D 46/52*     (2006.01)
    *B01D 46/62*     (2022.01)

(56)            References Cited

U.S. PATENT DOCUMENTS

| | | | |
|---|---|---|---|
| 11,503,970 B2 * | 11/2022 | Pi | A47L 9/125 |
| 2005/0241100 A1 | 11/2005 | Park | |
| 2016/0106284 A1 * | 4/2016 | Mantyla | A47L 9/149 |
| | | | 134/21 |
| 2020/0253442 A1 | 8/2020 | Hunnekuhl | |

FOREIGN PATENT DOCUMENTS

| | | | | |
|---|---|---|---|---|
| DE | 102016100820 A1 * | 7/2017 | | A47L 9/125 |
| DE | 102017126393 A1 * | 5/2019 | | A47L 9/20 |
| EP | 2601465 B1 | 8/2016 | | |
| RU | 2500331 C2 | 12/2013 | | |
| WO | 2018119512 A1 | 7/2018 | | |
| WO | 2020208786 A1 | 10/2020 | | |
| WO | 2020208788 A1 | 10/2020 | | |
| WO | 2020221625 A1 | 11/2020 | | |

* cited by examiner

136

138

300

600

602

VACUUM CLEANING DEVICE

FIELD OF INVENTION

The present disclosure relates to a vacuum cleaning device. In particular the present disclosure relates to vacuum cleaning device with an improved emptying function.

BACKGROUND OF THE INVENTION

Vacuum cleaning devices are used to clean floors and other dirty surfaces. Often vacuum cleaning devices comprise a dirt container which retains the dirt and debris no longer entrained in an airflow.

Users may not like emptying the dirt container because the user is required to touch the dirt container which may often be contaminated with dirt and debris when emptying the dirt container. This means the user may get their hands dirty when emptying the dirt container into a bin.

One known vacuum cleaning device is shown in WO2020/221625. This discloses a hand-held vacuum cleaning device which reverses the direction of the fan in order to generate a positive pressure airflow in the dirt container. This causes the dirt in the dirt container to be blown out of the dirt container via a door in the dirt container. The door in the dirt container adds complexity to the vacuum cleaner and the mechanism requires maintenance to prevent it from becoming clogged with dirt and debris.

Another vacuum cleaner is shown in DE102012100047. This also discloses that the vacuum cleaner can operate with a suction air flow and a blowing air flow. The blowing air flow can be used to clean the filter of the vacuum cleaner. A dust retention flap is used to prevent dust and other debris accidentally falling out of the dust container. A problem with DE102012100047 is that fine dust particles can be trapped in the structure around the filter and this limits the amount that the vacuum cleaner can be cleaned when the vacuum cleaner generates the blowing air flow.

BRIEF SUMMARY OF THE INVENTION

Examples of the present disclosure aim to address the aforementioned problems.

According to a first aspect of the present disclosure there is a vacuum cleaning device comprising: a housing having a dirty air inlet and a clean air outlet and an airflow path between the dirty air inlet and the clean air outlet; a dust container mounted to the housing wherein the airflow path goes through the dust container; a motor fan assembly mounted in the housing configured to create an air flow along the airflow path in a blow mode and a suction mode; and a controller configured to control the motor fan assembly in the blow mode and the suction mode; wherein the controller is configured to control the motor fan assembly to pulse the motor fan assembly at first fan speed when in the blow mode.

Optionally, the first fan speed is a maximum fan speed.

Optionally, the controller is configured to pulse the motor fan assembly at the first fan speed for a first time period.

Optionally, the first time period is between 600 ms-1000 ms.

Optionally, the controller is configured to pulse the motor fan assembly at a second fan speed when in the blow mode.

Optionally, the second fan speed is less than the first fan speed.

Optionally, the second fan speed is 20% of the maximum fan speed.

Optionally, controller is configured to pulse the motor fan assembly at the second fan speed for a second time period.

Optionally, the second time period is longer than the first time period.

Optionally, the second time period is between 750 ms to 2000 ms.

Optionally, the controller is configured to alternate pulsing the motor fan assembly between the first fan speed and the second fan speed.

Optionally, the controller is configured to actuate an indicator during the blow mode.

Optionally, the motor fan assembly is configured to generate an airflow from the dust container to the dirty air inlet in the blow mode.

Optionally, the motor fan assembly is configured to generate an airflow from the dirty air inlet to the dust container in the suction mode.

Optionally, the vacuum device is a handheld vacuum cleaner, a floor vacuum cleaner, a stickvac, a wet and dry vacuum cleaner or a canister vacuum cleaner.

Optionally, the controller is configured to control the motor fan assembly in a blow mode in dependence of a signal received from a user actuated interface.

Optionally, the user actuated interface is a button mounted on the housing.

In a second aspect of the present disclosure there is provided vacuum cleaning device comprising: a housing having a dirty air inlet and a clean air outlet and an airflow path between the dirty air inlet and the clean air outlet; a dust container mounted to the housing wherein the airflow path goes through the dust container; a motor fan assembly mounted in the housing configured to create an air flow along the airflow path in a blow mode and a suction mode; a filter assembly mounted to the housing on the airflow path between the dust container and the motor-fan assembly, the filter assembly having a coarse filter element and a fine filter element; wherein the filter assembly comprises an airflow bypass configured to allow the airflow to bypass the coarse filter element when the motor fan assembly is in the blow mode.

Optionally, the airflow bypass is a one-way bypass and configured to allow the airflow to bypass the coarse filter element when the motor fan assembly is in the blow mode.

Optionally, the airflow bypass is configured to be open when the motor fan assembly is in the blow mode.

Optionally, the airflow bypass is configured to be closed when the motor fan assembly is in the suction mode.

Optionally, the airflow bypass comprises a door moveable between an open position and a closed position.

Optionally, the door is hinged to the filter assembly.

Optionally, the door is biased to the closed position.

Optionally, the door is configured to be biased to the closed position under the force of gravity when the vacuum cleaning device is in an upright position.

Optionally, the door is spring biased to the closed position.

Optionally, the door is configured to seal against a lip in the closed position.

Optionally, the fine filter element is a pleated filter.

Optionally, the coarse filter element is a perforated material.

BRIEF DESCRIPTION OF THE DRAWINGS

Various other aspects and further examples are also described in the following detailed description and in the attached claims with reference to the accompanying drawings, in which:

DETAILED DESCRIPTION OF THE PREFERRED EMBODIMENTS

Figure 1:
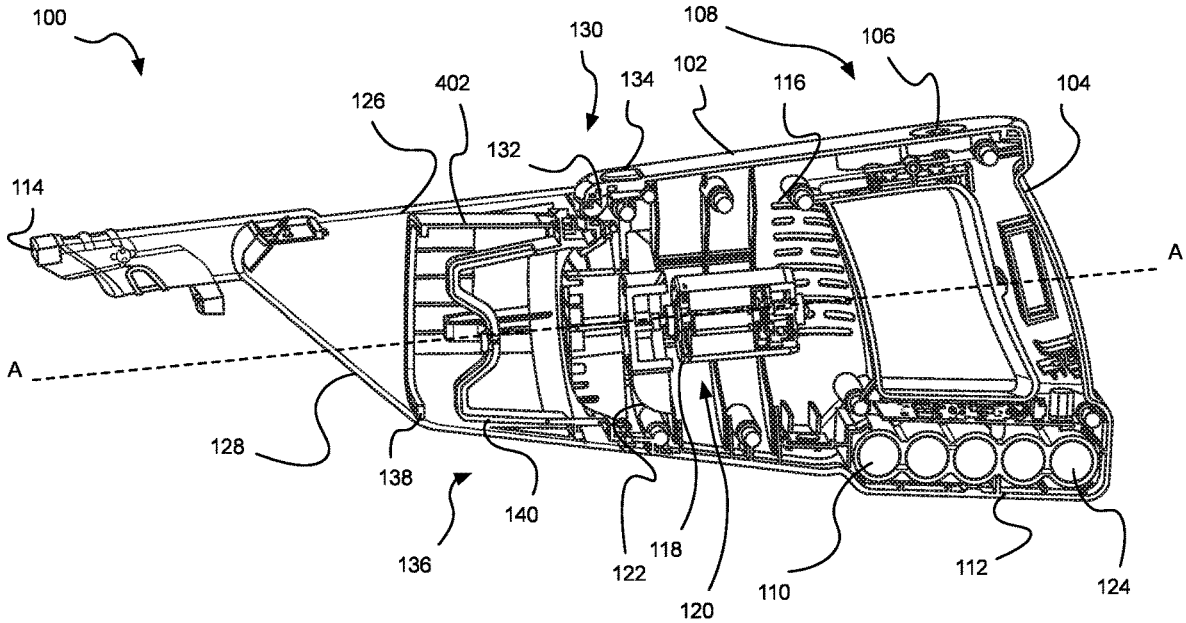
FIG. 1 shows a cross-sectional side view of a vacuum cleaning device according to an example.

FIG. 1 shows a cross-sectional side view of a vacuum cleaning device 100. The vacuum cleaning device 100 as shown in FIG. 1 is a handheld vacuum cleaner (also known as a "handvac"), but the in other examples the vacuum cleaning device 100 may be an upright vacuum cleaner, a stickvac, a canister vacuum cleaner or any other type of vacuum cleaner. References to vacuum cleaning device 100 hereinafter will be in reference to the handheld vacuum cleaner as shown in the Figures but the vacuum cleaning device 100 can be any type of vacuum cleaner.

The vacuum cleaning device 100 comprises a housing 102. The housing 102 comprises a clam shell type construction comprises two halves which are fastened together. The halves of the housing 102 are fastened together with screws but in alternative examples any suitable means for fastening the housing together may be used such as glue, clips, bolts and so on. For the purposes of clarity, the fastenings in the housing 102 are not shown.

The housing 102 comprises a handle 104. The handle 104 is integral with the housing 102 and the user grips the handle 104 when operating the vacuum cleaning device 100.

In some examples, the handle 104 comprises an ON/OFF switch 106 for operating the vacuum cleaning device 100. The switch 106 as shown in FIG. 1 is a push button mechanism mechanically coupled to a microswitch. The switch 106 positioned on a top side 108 of the housing 102. In other examples, the ON/OFF switch 106 can be located on any exterior surface of the vacuum cleaning device 100. For example, the switch 106 can be a trigger switch (not shown) located on the handle 104.

In some examples, the handle 104 comprises one or more indicators for providing information about the vacuum cleaning device 100 to the user. For example, a battery indicator (not shown) is mounted on the handle 104 for indicating to the user the charge level status of a battery 110.

The battery 110 is housed in a battery housing 112. The battery housing 112 is mounted to the housing 102. In some examples as shown in FIG. 1, the battery housing 112 is integral with the housing 102. In other examples, the battery housing 112 and the battery 110 are releasably mountable to the housing 102. In this way, the battery 110 can be switched with another battery.

The vacuum cleaning device 100 as shown in FIG. 1 comprises a generally elongate shape which extends along the general longitudinal axis A-A. At one end of the housing 102, the housing 102 comprises a dirty air inlet 114. The housing 102 also comprises a clean air outlet 116. An airflow path extends between the dirty air inlet 114 and the clean air outlet 116. The longitudinal axis of the dirty air inlet 114 is substantially parallel to the longitudinal axis A-A of the vacuum cleaning device 100. The clean air outlet 116 can comprises a plurality of openings which are mounted in the housing 102.

The vacuum cleaning device 100 comprises a motor fan assembly 120.

The motor fan assembly 120 comprises a motor 118 and a fan 122 configured to generate a negative pressure for sucking up dirt and debris via the dirty air inlet 114.

The motor fan assembly 120 is also configured to generate a positive pressure for blowing an airflow out of the dirty air inlet 114. In this way, in a first rotational direction, the motor fan assembly 120 is configured to generate a negative pressure airflow from the dirty air inlet 114 to the clean air outlet 116. In a second rotation direction, the motor fan assembly 120 is configured to generate a positive pressure airflow from the clean air outlet 116 to the dirty air inlet 114. In some examples, the motor fan assembly 120 can rotate in a clockwise direction to generate the suction airflow in a "suction mode" and in an anticlockwise direction to generate the blowing airflow in a "blow mode". Alternatively in other examples, the motor fan assembly 120 can rotate in a clockwise direction to generate the blowing airflow in the blow mode and in an anticlockwise direction to generate the suction airflow in the suction mode.

In some examples, the motor 118 is a brushed d.c. motor 118 with its drive shaft directly coupled to the fan 122. In some examples, the motor's drive shaft has a rotational speed within a range of 15,000 and 40,000 revolutions per minute (rpm). In other examples, the motor 118 can be a d.c. motor, an a.c. motor, or an asynchronous multiphase motor controlled by an electronic circuit (not shown). A permanent magnet brushless motor, a switched reluctance motor, a flux switching motor, or other brushless motor type, may have a high rotational speed within a range of 80,000 to 120,000 rpm. In some examples, the motor 118 can be coupled to the fan 122 via a gearbox (not shown).

The motor fan assembly 120 is housed within a motor housing portion of the housing 102 and electrically connected to a power source e.g. the battery 110. The battery 110 as shown in FIG. 1 comprises a plurality of battery cells 124. In some examples, the battery cells 124 are lithium ion batteries. In other examples, the battery 110 can be any suitable type of battery for use in a vacuum cleaning device 100. In other examples the vacuum cleaning device 100 additionally or alternatively comprises a mains electricity supply (not shown).

The rotation axis of the motor fan assembly 120 as shown in FIG. 1 is substantially parallel to the longitudinal axis A-A of the housing 102. In some examples, rotation axis of the motor fan assembly 120 is coaxial with the longitudinal axis A-A of the housing 102. However, in other examples, rotation axis of the motor fan assembly 120 can be offset from the longitudinal axis of the housing 102.

As shown in FIG. 1, the vacuum cleaning device 100 comprises a dirt container 126 configured to retain dirt and debris entrained in the airflow sucked into the vacuum cleaning device 100. The dirt container 126 is mounted on the airflow path between the dirty air inlet 114 and the clean air outlet 116. The dirt container 126 as shown in FIG. 1 comprises an external wall 128 which forms part of the external surface of the vacuum cleaning device 100. The dirt container 126 as shown in FIG. 1 comprises the dirty air inlet 114 and the dirt container 126 is integral with dirty air inlet 114. However, in other examples, the dirt container 126 and the dirty air inlet 114 are separate components.

In some examples, the dirt container 126 comprises a portion which is releasably mountable to the housing 102. In some examples, the entire dirt container 126 is releasably mountable to the housing 102. In other examples, the dirt container 126, additionally or alternatively, comprises a releasable door or lid (not shown) for emptying the dirt container 126.

As shown in FIG. 1, the dirt container 126 is held on the housing 102 with a securing mechanism 130. In some examples the securing mechanism 130 is a catch mechanism 132. In some examples the catch mechanism 132 is a living hinge with a hook portion which is integral with the dirt container 126 and arranged to couple with a reciprocal recess on the housing 102. The catch mechanism 132 comprises a release button 134 configured to release the catch mechanism 132 and permit separation of the dirt container 126 from the housing 102.

In other examples, any other suitable mechanism can be used for selectively releasing the dirt container 126 from the housing 102. For example any arrangement of clips, clamps, hooks, latches, catches etc can be used.

In some examples, at least a portion of the dirt container 126 is translucent or transparent so that the user can see the status of the dirt container 126. This makes it easier for the user to know when to empty the dirt container 126. In some examples, the entire dirt container 126 is translucent or transparent.

In other examples, the dirt container 126 is releasably removeable from the housing 102 such that the dirt container 126 can be completely removed from the housing 102. Alternatively, the dirt container 126 is moveably mounted e.g. pivotally mounted to the housing 102. In the example shown in FIG. 1, the dirt container 126 is completely removeable from the housing 102. This means that the dirt container 126 can be removed and washed separately from the vacuum cleaning device 100. For example, this allows the user to wash the dirt container 126 under a tap or in a dishwasher.

Figure 2:
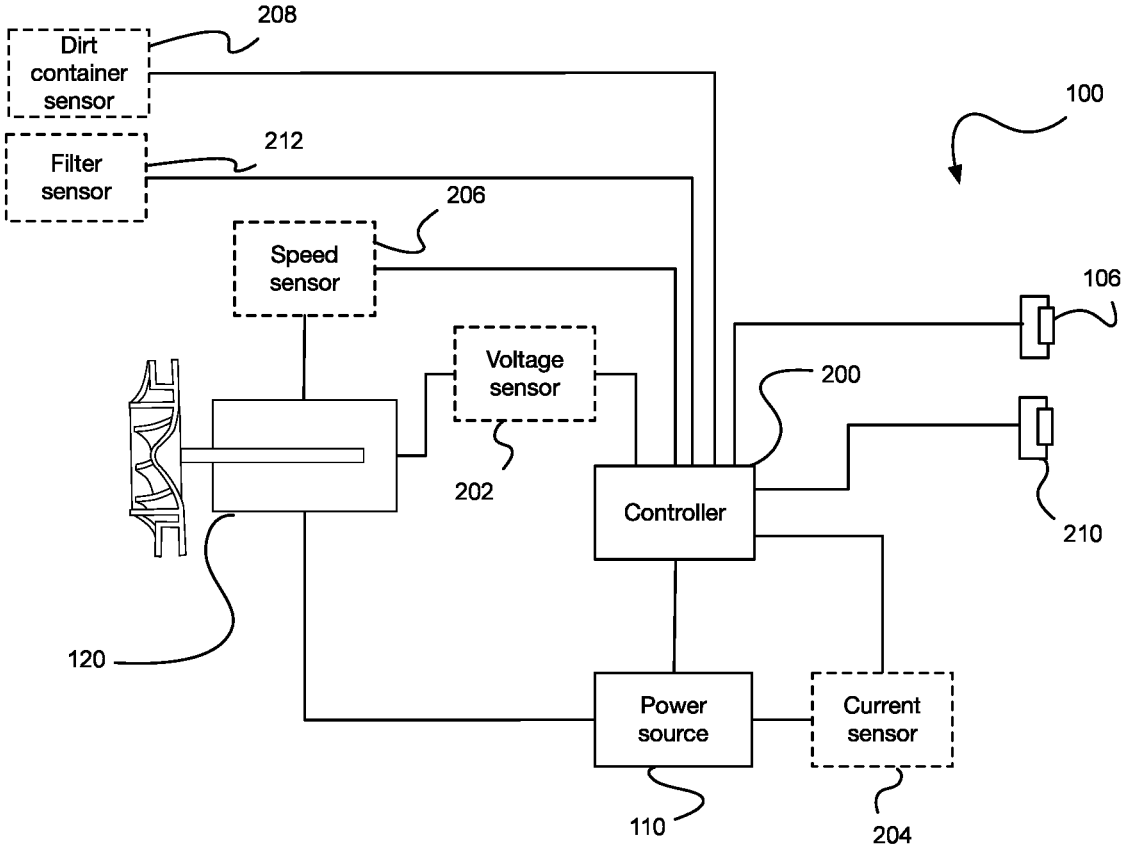
FIG. 2 shows schematic view of the vacuum cleaning device according to an example.

Operation of the motor fan assembly 120 is controlled by a controller 200. The controller 200 is best shown in FIG. 2. FIG. 2 shows a schematic drawing of the vacuum cleaning device 100. The controller 200 is configured to issue control signals to the motor fan assembly 120 to control the direction and speed of the motor fan assembly 120. For example, the controller 200 is configured to issue control signals to control the motor fan assembly 120 to generate a negative pressure airflow e.g. "suction mode" or a positive pressure airflow e.g. "blow mode". The controller 200 is electrically connected to a power source, e.g. the battery 110.

Optionally, the controller 200 is connected to one or more sensors 202, 204, 206, 208, 212. The sensors 202, 204, 206, 208, 212 are configured to detect one or more parameters of the vacuum cleaning device 100 and send sensor signals comprising information relating to the one or more detecting parameters to the controller 200. In some examples, the controller 200 is connected to a voltage sensor 202, a current sensor 204, a fan speed sensor 206, a dirt container sensor 208, and a filter sensor 212. The one or more optional sensors 202, 204, 206, 208, 212 are indicated as optional in FIG. 2 with dotted lines.

The dirt container sensor 208 is configured to determine whether a dirt container 126 is mounted to the housing 102. For example, the dirt container sensor 208 is a microswitch (not shown) which is depressed when the dirt container 126 is mounted to the housing 102. In some other examples, the dirt container sensor 208 can detect whether the dirt container 126 is full and needs emptying. The filter sensor 212 is configured to determine whether a filter assembly 136 is blocked. The filter sensor 212 can be a thermocouple configured to detect the temperature of the airflow inside the filter assembly 136. The sensors 202, 204, 206, 208 are optional and the controller 200 in some examples is not connected to any sensors. The controller 200 is configured to control the motor fan assembly 120 in dependence of the received sensor signals.

A filter assembly 136 is mounted in the dirt container 126 on the airflow path between the dirty air inlet 114 and the motor fan assembly 120. The filter assembly 136 comprises a coarse filter element 138 and a fine filter element 140. The coarse filter element 138 is also known as a "pre-filter" and is configured to stop larger particles entrained in the airflow. The coarse filter element 138 allows fine dirt particles to pass through. The coarse filter element 138 in some examples is a wire mesh, cloth mesh, plastic mesh, or a perforated plastic sheath. The fine filter element 140 in some examples is a pleated fabric filter configured to stop fine dirt particles. The fine filter element 140 is made from an air permeable material such as a non-woven material or alternatively a woven material. The materials and construction of the coarse and fine filter elements 138, 140 are known and will not be discussed any further.

FIG. 2 also shows that the controller 200 is connected to one or more user actuated buttons 106, 210. As mentioned previously, one button 106 mounted on the housing 102 is a ON/OFF button 106 for actuating the motor fan assembly 120. The controller 200 is configured to send a control signal to the motor fan assembly 120 to generate the negative pressure airflow when the controller 200 detects the actuation of the ON/OFF button 106.

In addition, the vacuum cleaning device 100 may optionally comprise a blow mode button 210. The blow mode button 210 can be mounted on the housing 102 similar to the ON/OFF button 106. In some examples, the blow mode button 210 may be mounted in a different position to the ON/OFF button 106. This may help prevent the user accidentally pressing the blow mode button 210. In some examples the blow mode button 210 may be mounted on the housing 102 in a position remote from the handle 104 such that it is not possible for the user to actuate the blow mode button 210 whilst holding the handle 104.

In some examples, the ON/OFF button 106 may also be the blow mode button 210. The controller 200 is configured to distinguish between different types of button presses to indicate different modes. For example, when the controller 200 detects a long button press on the ON/OFF button 106, the controller 200 sends a control signal to actuate the motor fan assembly 120. When the controller 200 detects a short button press on the ON/OFF button 106, the controller 200 sends a control signal to actuate the "blow mode" motor fan assembly 120. The blow mode of the motor fan assembly 120 is discussed in more detail below.

In some other examples, when the controller 200 detects a single button press on the ON/OFF button 106, the controller 200 sends a control signal to actuate the motor fan assembly 120. When the controller 200 detects a plurality of button presses on the ON/OFF button 106, the controller 200 sends a control signal to actuate the "blow mode" motor fan assembly 120. The controller 200 is configured to detect different user interactions with the ON/OFF button 106 and control the vacuum cleaning device 100 accordingly.

In some examples, the controller 200 is configured to detect a signal received from the blow mode button 210 when the user actuates the blow mode button 210. When the controller 200 determines that the blow mode button 210 has been actuated, the controller 200 is configured to issue a control signal to the motor fan assembly 120.

In some examples the controller 200 is configured to reverse the rotational direction of the motor fan assembly 120 in the blow mode. In the blow mode the motor fan assembly 120 is configured to generate a positive pressure airflow. Accordingly, when the controller 200 controls motor fan assembly 120 in order to generate a positive pressure airflow, an airflow is blown out of the dirty air inlet 114 from the dirt container 126.

In some examples, there is no blow mode button 210. Instead, the controller 200 issues a control signal to the motor fan assembly 120 in dependence of other parameters. For example, the controller 200 determines that a blow mode control signal is issued to the motor fan assembly 120 based on determined characteristics of the motor 118 from e.g. the voltage sensor 202, the current sensor 204 and/or the fan speed sensor 206.

Alternatively, the controller 200 determines that a blow mode control signal is issued to the motor fan assembly 120 based on determined characteristics of the dirt container 126 e.g. a received dirt container "full" signal from the dirt container sensor 208. Alternatively, the controller 200 determines that a blow mode control signal is issued to the motor fan assembly 120 based on determined characteristics of the filter assembly 136 e.g. a received filter "blocked" signal from the filter sensor 212. Indeed, the controller 200 can issue a control signal to control the motor fan assembly 120 in the blow mode based on any received signal or determined parameter.

Figure 8:
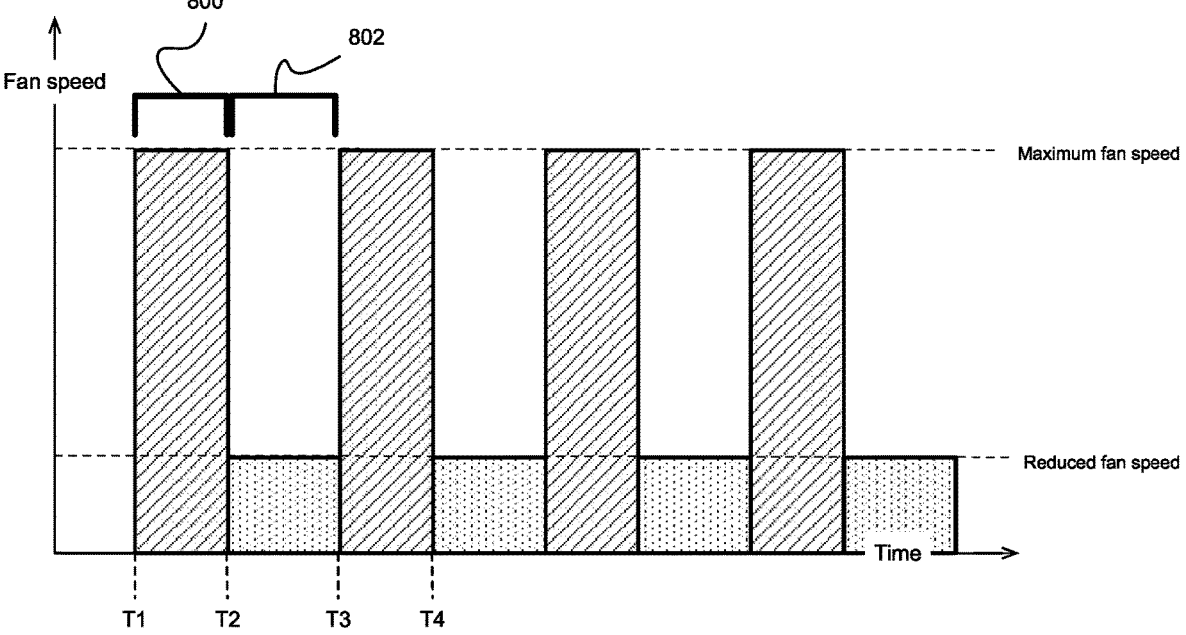
FIG. 8 shows a graph of motor-fan assembly operation over time of a vacuum cleaning device according to an example.

Operation of the vacuum cleaning device 100 will now be discussed in reference to FIG. 8. FIG. 8 shows a graph of the fan speed of the motor fan assembly 120 over time.

As mentioned above, the controller 200 is configured to issue a control signal to the motor fan assembly 120 to reverse the rotational direction and generate a positive pressure airflow out of the dirty air inlet 114. The positive pressure airflow is configured to flow along the airflow path in the dirt container 126 and out of the dirty air inlet 114. As the positive pressure airflow flows through the dirt container 126, the dirt and debris in the dirt container 126 are entrained in the positive pressure airflow. Accordingly, the dirt and debris in the dirt container 126 are picked up and blown out of the dirty air inlet 114. The user and hold the vacuum cleaning device 100 over a receptacle such as a bin for collecting the dirt and debris blown out of the dirt container 126.

It has been realised that a continuous positive pressure airflow in the blow mode causes a dust cloud when the user directs the dirty air inlet 114 towards a receptacle such as a bin. The continuous positive pressure airflow blows a cloud of dirt and debris back towards the user. This is because the receptacle may redirect the airflow back towards the user since the air already in the receptacle is pushed out by the positive pressure airflow. The dust cloud is unpleasant and can make the user dirty as well as other surfaces dirty. This can cause unanticipated cleaning work for the user.

Instead, the controller 200 is configured to issue a control signal to the motor fan assembly 120 to pulse the motor fan assembly 120 at first fan speed when in the blow mode. In some examples, the first fan speed of the motor fan assembly 120 is at a maximum fan speed. In some other examples the first fan speed is 50%, 60%, 70%, 80%, or 90% of maximum fan speed. In some examples, the first fan speed is between 19000 to 20000 rpm.

As shown in FIG. 8, at t=T1, the motor fan assembly 120 is operating at maximum fan speed in the blow mode. The controller 200 continues to keep the motor fan assembly 120 operating in blow mode at the maximum fan speed for a first time period 800, e.g., between times t=T1 and T2. In some examples, the first time period 800 is 600 ms-1000 ms.

Prior to t=T1, the motor fan assembly 120 as stationary or was operating in a suction mode with the motor fan assembly 120 rotating in an opposite rotational direction. In this case, the fan speed graph shown in FIG. 8 is an ideal representation and shows an instantaneous fan speed increase. The fan speed of the motor fan assembly 120 will increase over time until at t=T1 the fan speed is at a maximum speed due to inertia in the motor fan assembly.

After the first time period 800, the controller 200 issues a control signal to the motor fan assembly 120 to reduce the fan speed in a second time period 802 e.g., between t=T2 to T3. Similarly, the fan speed will decrease over time after t=T2 until the fan speed is at a reduced fan speed.

In some examples, the controller 200 issues a control signal to the motor fan assembly 120 to reduce the fan speed to stationary. However, it is possible that a user thinks that the vacuum cleaning device 100 is no longer in blow mode once the first time period 800 has ended because the motor fan assembly 120 has stopped.

Accordingly, the controller 200 is configured to issue an indication signal to one or more components of the vacuum cleaning device 100. The indication signal is configured to actuate one or more components of the vacuum cleaning device 100 to indicate to the user that the blow mode is still active and a subsequent pulse of the motor fan assembly 120 in blow mode will soon be generated.

In some examples, the indication signal is a control signal sent by the controller 200 to the motor fan assembly 120. In this way, the controller 200 sends a control signal to the motor fan assembly 120 to pulse the motor fan assembly 120 at a second fan speed when in the blow mode. In some examples, the second fan speed is less than the first fan speed. In some examples, the second fan speed is 20% of the maximum fan speed. In some other examples the second fan speed is 0%, 10%, 20%, 30%, or 40% of maximum fan speed. In some examples, the second fan speed is between 2000 to 3000 rpm.

By controlling the second fan speed to be lower than the first fan speed during the second time period 802, the user knows that the blow mode is still active due to the sound and vibration generated by the motor fan assembly 120.

In some examples, the second time period 802 is longer than the first time period 800. In some examples, the second time period 802 is between 750 ms to 2000 ms. During the second time period 802, the dust cloud has time to settle back down into the receptacle and is not blown towards the user by the next pulse of positive pressure airflow.

The controller 200 then alternates the fan speed of the motor fan assembly 120 as shown in FIG. 8. As shown in FIG. 8, the controller 200 sends a control signal to the motor fan assembly 120 in t=T3 to T4 identical to that during the first time period 800. The controller 200 continues pulsing the motor fan assembly 120 for a predetermined period of time. For example, the motor fan assembly 120 may pulse in blow mode 5, 10, or 20 etc. times. In some examples, the motor fan assembly 120 can pulse any number of times as required to empty the dirt container 126 and the filter assembly 136.

As mentioned above, the motor fan assembly 120 operating in the second time period 802 at the second fan speed is used to indicate to the user that the vacuum cleaning device 100 is operating in a blow mode. In some examples, the controller 200 is configured not to actuate the motor fan assembly 120 during the second time period 802. Instead, the controller 200 sends a control signal to actuate one or more other components of the vacuum cleaning device 100. This may be preferable because this will reduce the power consumption of the motor fan assembly 120 during the blow mode.

In some examples, the controller 200 sends a control signal to flash an LED (not shown) mounted on the housing 102. The LED can illuminate the translucent dirt container 126 to show that the vacuum cleaning device 100 is still in blow mode during the second time period 802. In other examples, the controller 200 can send a control signal to a buzzer to generate a sound, or a haptic feedback generator to vibrate the handle 104. Indeed, any suitable alert or indication can be generated to notify that the vacuum cleaning device 100 is actuated during the second time period 802.

Figure 3:
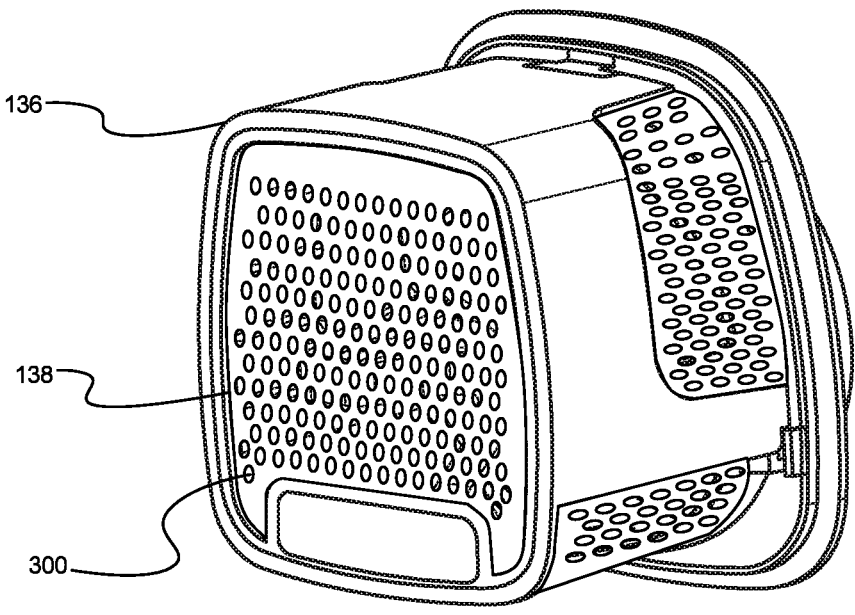
FIGS. 3 to 5 show perspective view of a filter assembly of a vacuum cleaning device according to an example.
Figure 4:
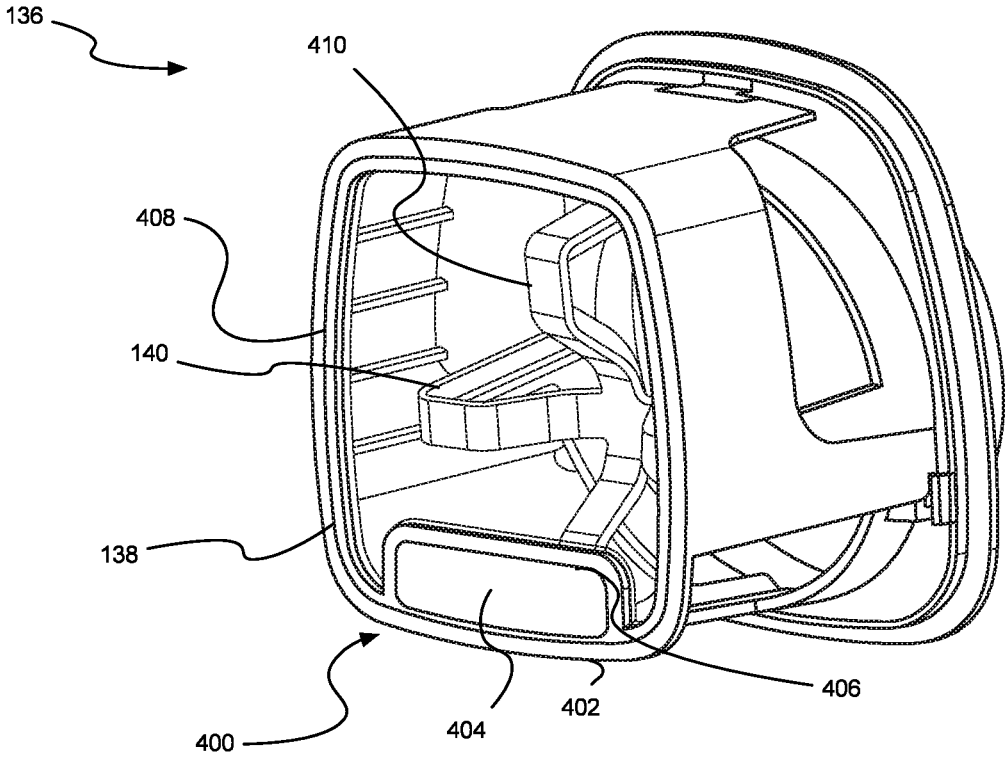
Figure 5:
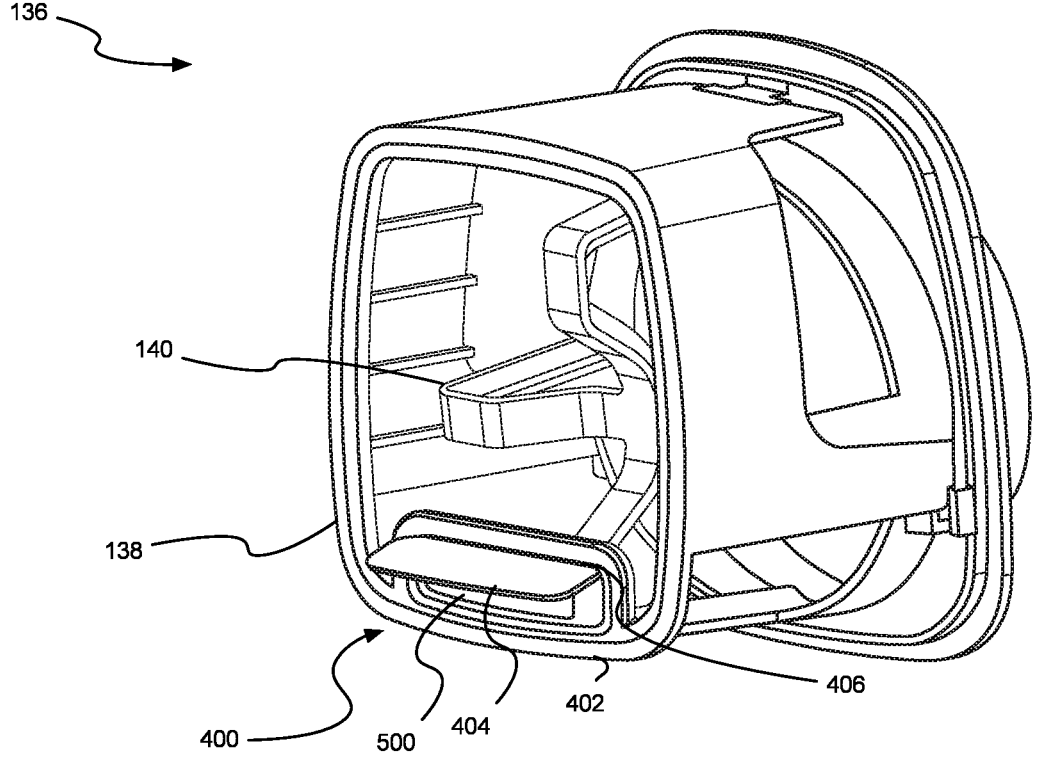
Figure 6:
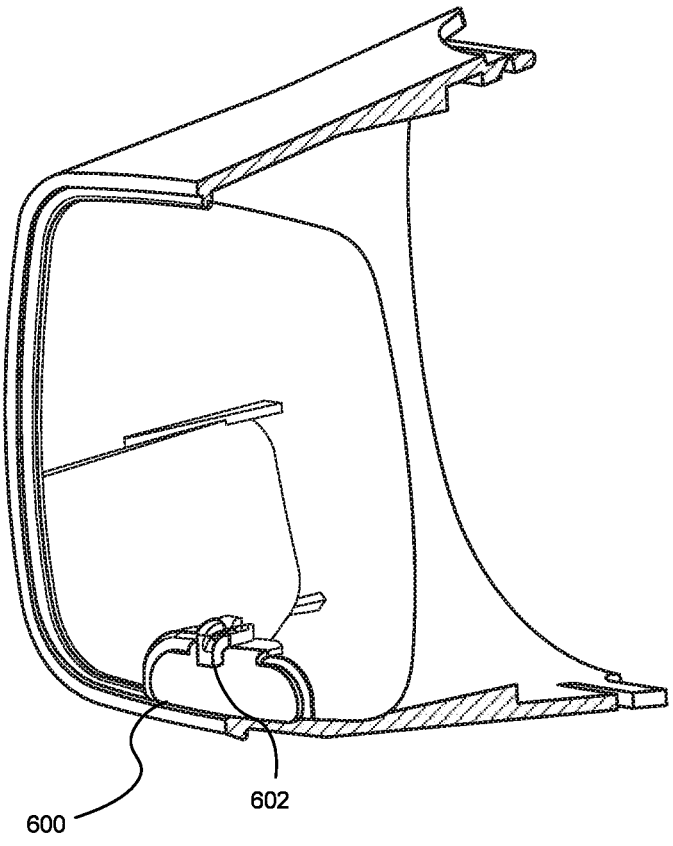
FIG. 6 shows a cut away perspective view of a filter assembly of a vacuum cleaning device according to an example.
Figure 7:
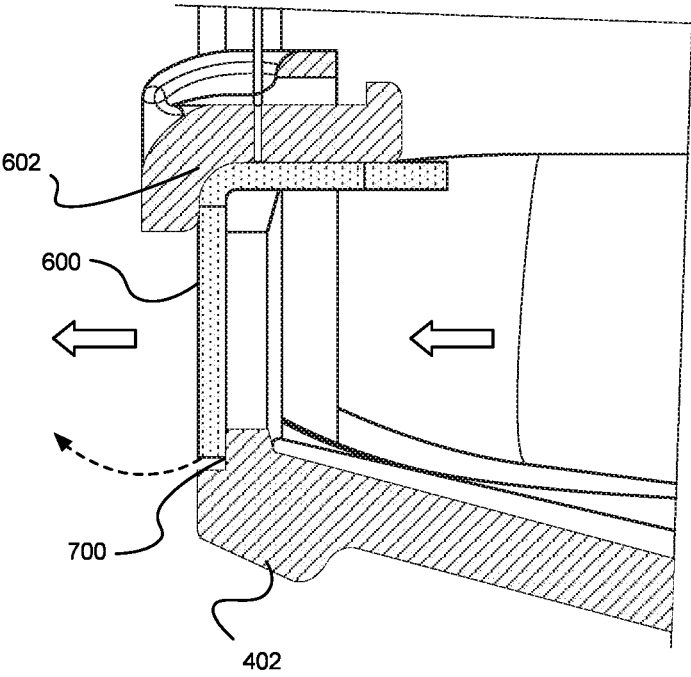
FIG. 7 shows a cross-sectional side view of a filter assembly of a vacuum cleaning device according to an example.

As mentioned above, the blow mode is used to clean the dirt container 126 and the filter assembly 136. The cleaning of the filter assembly 136 will now be further discussed in more detail with reference to FIGS. 3 to 7. FIGS. 3 to 5 show a perspective view of the filter assembly 136. FIG. 6 shows a cut away perspective view of the filter assembly 136. FIG. 7 shows a cross-sectional side view of the filter assembly 136.

As mentioned above, the filter assembly 136 comprises the coarse filter element 138 and the fine filter element 140. FIG. 3 shows the coarse filter element 138. The coarse filter element 138 comprises a plurality of holes or perforations 300 in a mesh or plastic sheath. The perforations 300 are exemplary and the perforations 300 can comprise any size and shape depending on the size of the dust and debris particles. For example, the coarse filter element 138 can be a wire or plastic mesh.

The coarse filter element 138 surrounds the fine filter element 140 such that the coarse filter element 138 is upstream of the fine filter element 140 when the vacuum cleaning device 100 operates in suction mode. This means the airflow must go through the coarse filter element 138 before the fine filter element 140 in suction mode.

FIG. 4 shows the filter assembly 136 with part of the coarse filter element 138 removed for the purposes of clarity. Furthermore, the material of the fine filter element 140 is also not shown for the purposes of clarity. A fine filter element holder 410 is shown in FIG. 4. The fine filter element holder 410 is configured to hold the material of the fine filter element 140 in position.

When the vacuum cleaning device 100 is operating in blow mode, the positive pressure airflow removes the dirt and debris from the dirt container 126 and the filter assembly 136. A problem is that the fine dust removed from the airflow by the fine filter element 140 becomes trapped between the fine filter element 140 and the coarse filter element 138. Therefore, whilst the dirt container 126 can be emptied in blow mode, an amount of fine dust is not expelled from the filter assembly 136.

In order to allow the positive pressure airflow to better remove the fine dust from the filter assembly 136, the filter assembly 136 comprises an airflow bypass 400 configured to allow the airflow to bypass the coarse filter element 138 when the motor fan assembly 120 is in the blow mode.

The airflow bypass 400 is configured to open during blow mode and close during the suction mode. In this way, the airflow bypass 400 is a one-way valve configured to allow a positive pressure airflow during blow mode and prevent a negative pressure airflow during suction mode.

The airflow bypass 400 is mounted into the filter assembly 136. As shown in FIG. 4, the airflow bypass 400 is mounted in a filter assembly frame 402. The filter assembly frame 402 is configured to hold the coarse filter element 138 around the fine filter element 140 within the dirt container 126. The fine filter element holder 410 is mountable to the filter assembly frame 402 and/or the housing 102. The filter assembly frame 402 is configured to be mounted to the dirt container 126 and the housing 102 as shown in FIG. 1. The filter assembly frame 402 in some examples is configured to clip into retaining clips on the housing 102. The filter assembly frame 402 can be mounted to the housing 102 with other fastening mechanisms e.g., screws, glue etc.

In some examples, the airflow bypass 400 comprises a moveable door 404 moveable between a closed position in suction mode as shown in FIG. 4 and an open position in blow mode as shown in FIG. 5. The moveable door 404 is hinged to the filter assembly frame 402. In some examples, the moveable door 404 is mounted at a lower portion of the filter assembly frame 402 and the moveable door 404 is hinged along a top edge 406 of the moveable door 404. This means that the moveable door 404 is the door is biased to the closed position. The moveable door 404 is configured to be biased to the closed position under the force of gravity when the vacuum cleaning device 100 is held by the user in an upright position (e.g., in the orientation as shown in FIG. 1).

Whilst FIGS. 4 and 5 show the moveable door 404 located at the bottom of the filter assembly frame 402, the moveable door 404 can be mounted at any position on the filter assembly frame 402. However, by placing the moveable door 404 at the bottom of the filter assembly frame 402 and on a front surface 408 which faces the dirty air inlet 114, the dirt and debris can more easily be removed during the blow mode.

In some other examples, the moveable door 404 is spring biased to the closed position with a spring element (not shown). In some other examples, the moveable door 404 does not need to be biased to the closed position, because the positive pressure airflow opens the moveable door 404 in the blow mode and the negative pressure airflow closes the moveable door 404 in the suction mode.

When the moveable door 404 is in the open position, an aperture 500 allows the positive pressure airflow to flow around the coarse filter element 138.

Another example of the moveable door 600 is shown in FIGS. 6 and 7. The moveable door 600 is hinged to the filter assembly frame 402 via a hinge mechanism 602. The moveable door 600 is configured to seal against a lip 700 of the filter assembly frame 402 in the closed position as shown in FIG. 7. In some examples, the lip 700 comprises a rubber or silicone seal (not shown) for engaging the moveable door 600 in the closed position.

In another example, two or more examples are combined. Features of one example can be combined with features of other examples.

Examples of the present disclosure have been discussed with particular reference to the examples illustrated. However it will be appreciated that variations and modifications may be made to the examples described within the scope of the disclosure.

What is claimed is:
1. A vacuum cleaning device comprising:
   a housing having a dirty air inlet and a clean air outlet and an airflow path between the dirty air inlet and the clean air outlet;
   a dust container mounted to the housing, wherein the airflow path goes through the dust container;

a motor fan assembly mounted in the housing configured to create a negative pressure airflow along the airflow path in a suction mode and a positive pressure airflow along the airflow path in a blow mode; and a filter assembly mounted to the housing in the airflow path between the dust container and the motor-fan assembly, the filter assembly having a frame, a coarse filter element mounted to the frame and configured to stop relatively large dirt particles entrained in the negative pressure airflow during the suction mode, a fine filter element configured to stop relatively fine dirt particles entrained in the negative pressure airflow, and an airflow bypass directly attached to the frame and operated during the blow mode to enable the positive pressure airflow to flow through the airflow bypass and bypass the coarse filter element, wherein the relatively large dirt particles are larger than the fine dirt particles, and wherein, during the blow mode, the positive pressure airflow flows from the motor fan assembly, through the fine filter element, then through the airflow bypass, into the dust container, and out of the dirty air inlet, causing the fine dirt particles that are in a space between the fine filter element and the coarse filter element to bypass the coarse filter element and flow through the airflow bypass into the dust container and out of the dirty air inlet.

2. The vacuum cleaning device according to claim 1, wherein the airflow bypass is a one-way valve configured to allow the positive pressure airflow to flow through the airflow bypass during the blow mode and configured to prevent the negative pressure airflow from flowing through the airflow bypass during the suction mode.

3. The vacuum cleaning device according to claim 1, wherein the frame includes an opening, and wherein the airflow bypass comprises a door directly attached to the opening of the frame and configured to be open during the blow mode to allow the positive pressure airflow to flow through the opening of the frame.

4. The vacuum cleaning device according to claim 3, wherein the door is configured to be closed during the suction mode to prevent the negative pressure airflow from flowing through the opening of the frame.

5. The vacuum cleaning device according to claim 1, wherein the airflow bypass comprises a door moveable between an open position during the blow mode and a closed position during the suction mode.

6. The vacuum cleaning device according to claim 5, wherein the door is hinged to the frame via a hinge mechanism along an edge of the door.

7. The vacuum cleaning device according to claim 5, wherein the door is placed on a front surface of the frame that faces the dust container and the dirty air inlet.

8. The vacuum cleaning device according to claim 5, wherein the door is configured to be biased to the closed position under the force of gravity when the vacuum cleaning device is in an upright position.

9. The vacuum cleaning device according to claim 5, wherein the door is spring biased to the closed position.

10. The vacuum cleaning device according to claim 5, wherein the door is configured to seal against a lip on the frame in the closed position.

11. The vacuum cleaning device according to claim 1, wherein the fine filter element is a pleated fabric filter.

12. The vacuum cleaning device according to claim 1, wherein the coarse filter element comprises a plastic sheath having a plurality of holes or perforations to stop the large dirt particles entrained in the negative pressure airflow from passing through and allow the fine dirt particles entrained in the negative pressure airflow to pass through during the suction mode.

* * * * *